(No Model.)
A. DEBAYEUX.
BALLOON OR AERIAL MACHINE.
No. 282,060. Patented July 31, 1883.
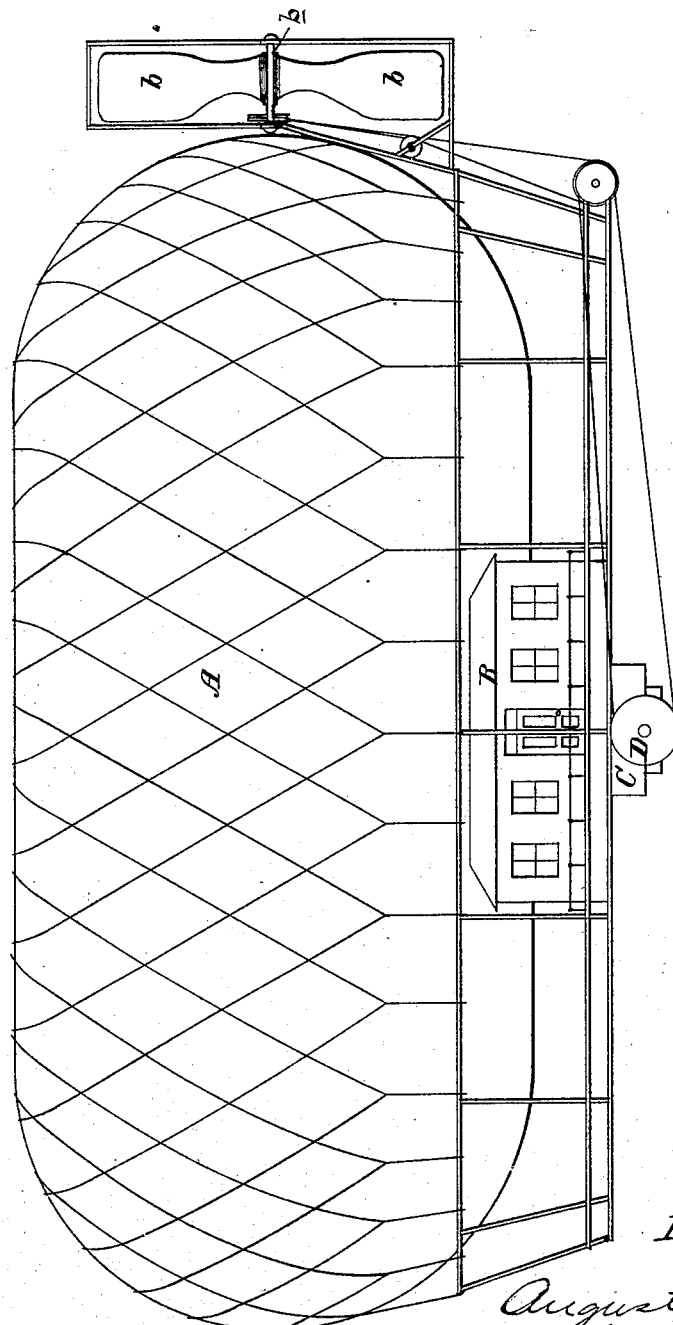

UNITED STATES PATENT OFFICE.

AUGUSTE DEBAYEUX, OF PARIS, FRANCE.

BALLOON OR AERIAL MACHINE.

SPECIFICATION forming part of Letters Patent No. 282,060, dated July 31, 1883.

Application filed May 21, 1881. (No model.) Patented in France May 2, 1879, No. 130,433; in Germany August 20, 1881, No. 18,445; in Belgium November 10, 1882, No. 59,535, and in Italy November 21, 1882, No. 14,797.

*To all whom it may concern:*

Be it known that I, AUGUSTE DEBAYEUX, a citizen of France, residing at Paris, in the Republic of France, have invented certain Improvements in Balloons or Aerial Machines, of which the following is a specification.

The primary objects of this invention are to propel and guide balloons or aerial machines, and these are accomplished by the rarefaction of the air, substantially in the following manner. This rarefaction of the air, by which, according to this invention, a balloon is propelled and guided, is obtained by placing a fan or fan-like screw or screws or other such like appliance or appliances capable of producing a partial vacuum or rarefaction of the air at or about that point of the apparatus in the direction it is desired to be propelled, which propulsion is then effected by the pressure of the atmosphere on the other or opposite side or end of the balloon to that at which the rarefaction or partial vacuum of the air is produced. The fan or fan-like screw or screws or other equivalent appliance or appliances, being placed at the front, for example, acts as an aspirator to turn to the side the column of air which is encountered as the machine advances. This fact of the rarefaction of the air being obtained by a fan produces at this part of the machine a relative vacuum in relation to the other or opposite parts, where the air, being more dense, propels the balloon toward the spot where the air is more rarefied, whereby progress in the required direction is produced.

It is to be understood that any kind of fan or fans may be employed that is or are capable of rarefying the air, whether made with straight, curved, or any other form of wings or blades. They may be of metal, whalebone, or any other suitable material, open or closed. As a motor to drive these fans, a steam-engine may be used; but, according to the size of the machine, it may be driven by hand or other convenient power, as this is only a detail to be regulated by the size of the apparatus and according to the speed to be obtained.

By means of this invention is obtained the propulsion, and with it the direction, of the balloon or aerial machine of any form, by the rarefaction of the air producing a relative vacuum in the direction in which it is desired to travel. For example, a fan or its equivalent is placed at that part of the balloon where a vacuum is required. Any of the described or other known means for producing this rarefaction of the air or relative vacuum may be used.

These aerial machines or balloons may be inflated with carbureted or pure hydrogen gas, or with any other suitable gas.

Many attempts have been made to obtain and secure the propulsion of the conveyance in aerial navigation. The greater part, not to say all, are intended to propel a balloon against the wind either by means of oars or fans placed on the conveyance, or by sails. Now, this invention is upon an essentially different basis. By making a relative vacuum opposite a part of the balloon, a road is opened, so that the aerostat may pass without encountering resistance.

The rudder, should one be required, is a sheet of metal or any other material such as may be thought suitable, according to the shape and size of aerial machine to be guided; or a screw may be used therefor as an additional means of steering or directing this aerial machine or balloon. Shutter or blind-like appliances capable of being rolled up or unrolled or otherwise adjusted by being set at an angle or angles or otherwise, and placed before or in front of the fan or at each side, may be employed.

Fans or fan-like screw appliances may be used to act as brakes and to regulate the descent of the machine.

The conveyance may be rounded, square, or pointed at the end. The brake, screw, fan, or equivalent may have as many wings as desired—say six. The frame or carriage is connected, preferably by net-work, to the balloon, and carries the driving-power, from which motion is communicated to the fan-screw by suitable pulleys and bands or other suitable mechanism.

The accompanying drawings illustrate in side elevation an aerial machine or balloon constructed according to my invention.

A is the balloon proper. *b b* are fans or fan-like appliances for producing a vacuum or rarefaction of the air at the ends or sides of the machine. B is the carriage or vessel connected to the balloon by net-work or otherwise, for carrying the motive power, cargo, fuel, provisions, and other things, as well as passengers. C is the engine, and D the driving-wheel.

Motion is communicated to the several fans or fan-like appliances by suitable driving-bands, pulleys, or other available appliances, as may be found convenient.

I claim—

1. In an aerial machine or balloon, the mode of propulsion of same herein set forth by creating a partial vacuum in the direction in which the machine is to be propelled or guided, substantially as set forth.

2. The combination, with the balloon and its driving appliances, of a fan arranged at the front and constructed to create a partial vacuum at such point, substantially as set forth.

AUGUSTE DEBAYEUX.

Witnesses:
M. SAUTTER,
ED. SCHMIDT.